US009508065B2

United States Patent
Ronca et al.

(10) Patent No.: US 9,508,065 B2
(45) **Date of Patent: *Nov. 29, 2016**

(54) METHOD AND APPARATUS FOR PROVIDING REAL TIME MUTABLE CREDIT CARD INFORMATION WITH FUTURE TIMESTAMP FUNCTIONALITY

(71) Applicant: Bank of America Corporation, Charlotte, NC (US)

(72) Inventors: James G. Ronca, Decatur, GA (US); Akshaya Negi, Charlotte, NC (US); Matthew L. Donlan, Charlotte, NC (US); Scott L. Harkey, Concord, NC (US); Tony England, Tega Cay, SC (US)

(73) Assignee: Bank of America Corporation, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 14/973,916

(22) Filed: Dec. 18, 2015

(65) Prior Publication Data

US 2016/0104158 A1 Apr. 14, 2016

Related U.S. Application Data

(63) Continuation of application No. 14/263,013, filed on Apr. 28, 2014, now Pat. No. 9,218,596.

(51) Int. Cl.
*G06Q 40/00* (2012.01)
*G06Q 20/10* (2012.01)
(Continued)

(52) U.S. Cl.
CPC ....... *G06Q 20/105* (2013.01); *G06K 19/06206* (2013.01); *G06K 19/0727* (2013.01); *G06K 19/07701* (2013.01); *G06K 19/07749* (2013.01); *G06Q 20/322* (2013.01);
(Continued)

(58) Field of Classification Search
USPC .............. 235/379, 380, 472.01–472.03, 492; 705/41, 44
See application file for complete search history.

(56) References Cited

U.S. PATENT DOCUMENTS 8,020,756 B2 9/2011 Brown et al.
8,365,988 B1 2/2013 Medina, III et al.
(Continued)

OTHER PUBLICATIONS

"uDynamo," MagTek Inc., Seal Beach, California, Dec. 2013.
(Continued)

*Primary Examiner* — Jamara Franklin
(74) *Attorney, Agent, or Firm* — Weiss & Arons LLP; Michael A. Springs, Esq.

(57) ABSTRACT

A method for using a smartcard is provided. The smartcard may include a microprocessor chip, a button, a dynamic transaction authorization number, a Bluetooth low energy ("BLE") device, and a battery. The battery may power the BLE and the microprocessor chip. The smartcard may also include memory. The memory may store the dynamic transaction authorization number. The smartcard may also include a dynamic magnetic strip. The dynamic magnetic strip may include a digital representation of the dynamic transaction authorization number. The method may include pressing the button. The method may also include transmitting an instruction to a smartphone for a request for a dynamic transaction authorization number. The transmission of an instruction may be in response to the pressing of the button. The method may also include receiving a dynamic transaction authorization number from a smartphone.

18 Claims, 4 Drawing Sheets

(51) Int. Cl.

| | |
|---|---|
| ***G06Q 20/34*** | (2012.01) |
| ***G06K 19/06*** | (2006.01) |
| ***G06K 19/077*** | (2006.01) |
| ***G06K 19/07*** | (2006.01) |
| ***G06Q 20/32*** | (2012.01) |
| ***G06Q 20/38*** | (2012.01) |
| ***G06Q 20/40*** | (2012.01) |

(52) U.S. Cl.
CPC ....... *G06Q 20/341* (2013.01); *G06Q 20/3415* (2013.01); *G06Q 20/3563* (2013.01); *G06Q 20/3829* (2013.01); *G06Q 20/401* (2013.01)

(56) References Cited

U.S. PATENT DOCUMENTS

| | | | |
|---|---|---|---|
| 8,375,212 | B2 | 2/2013 | Buck et al. |
| 2003/0075610 | A1 | 4/2003 | Ong |
| 2013/0110658 | A1 | 5/2013 | Lyman et al. |
| 2013/0299592 | A1 | 11/2013 | Chiang |

OTHER PUBLICATIONS

“Dynamics Debuts Next-Generation Payment Card With Options for Credit and In-Store Point Redemption,” Gizmodo.com, Oct. 5, 2010.

“Preventing Fraud and the Use of Counterfeit Cards,” Magensa LLC., Seal Beach, California, retrieved on Mar. 14, 2014.

METHOD AND APPARATUS FOR PROVIDING REAL TIME MUTABLE CREDIT CARD INFORMATION WITH FUTURE TIMESTAMP FUNCTIONALITY

CROSS-REFERENCE TO RELATED APPLICATION

This application is a continuation of prior U.S. patent application Ser. No. 14/263,013, filed on Apr. 28, 2014, which is hereby incorporated by reference herein in its entirety.

FIELD OF TECHNOLOGY

This invention relates to real time mutable credit card information.

BACKGROUND OF THE DISCLOSURE

Credit and debit card information may include a card number, a card security code, a card holder name, a card expiration date and/or any other pertinent information.

Credit and debit card information has been subject to many security breaches in recent years. Credit and debit card information may be stolen in many different ways. For example, this information can be stolen at an automatic teller machine ("ATM") or in any other suitable location.

Card information theft can occur if someone places a skimming device on the ATM card reader which reads the information from the card's magnetic strip.

Card information can also be stolen at a retail location. This can occur if someone places a skimming device on the card reader at the retail location, which reads the card information from the card's magnetic strip. The skimming device may save the card information and/or may transmit the card information to a thief. The thief may then use the card information to make unauthorized purchases. In addition, there are many other ways that have not been described, in which card information may be stolen.

A card user may realize, at a later date, that his or her credit card information was stolen. The realization may occur when the card user receives his or her credit or debit card bill, and sees transactions that he or she did not execute and/or authorize. The card user may then contact the company which issued the card—e.g., the bank, or credit card company—to report fraud on his or her card.

The issuing company may decide to refund the user for the fraudulent transaction(s), and issue the user a new card. Issuance of a new card, including new card information, in addition to refunding a transaction, may be expensive for the company issuing the card.

In addition, if fraudulent activity occurs in a major retail store, the issuing card company may automatically send out new cards, with new card information, to any user who frequented the particular retail store in a specific time frame, e.g., a recent time frame. Sending new cards, with new card information, to millions of shoppers can be very costly for the company issuing the cards.

Therefore, it would be advantageous for a company issuing a card to have the ability to change the card information without sending new physical cards.

SUMMARY OF THE INVENTION

An apparatus for providing real time mutable credit card information is provided. The apparatus may include a smartcard. The smartcard may include a microprocessor chip, a button coupled to the microprocessor chip, a dynamic transaction authorization number and a Bluetooth low energy device ("BLE") coupled to the microprocessor chip. The BLE may be configured to transmit, in response to depression of the button, an instruction to a smartphone for a request for a dynamic transaction authorization number. The BLE may also be configured to receive the dynamic transaction authorization number from the smartphone. The smartcard may also include a battery. The battery may be configured to power the BLE and microprocessor chip. The smartcard may also include memory. The memory may be configured to store the dynamic transaction authorization number. The smartcard may also include a dynamic magnetic strip. The dynamic magnetic strip may include a digital representation of the dynamic transaction authorization number.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
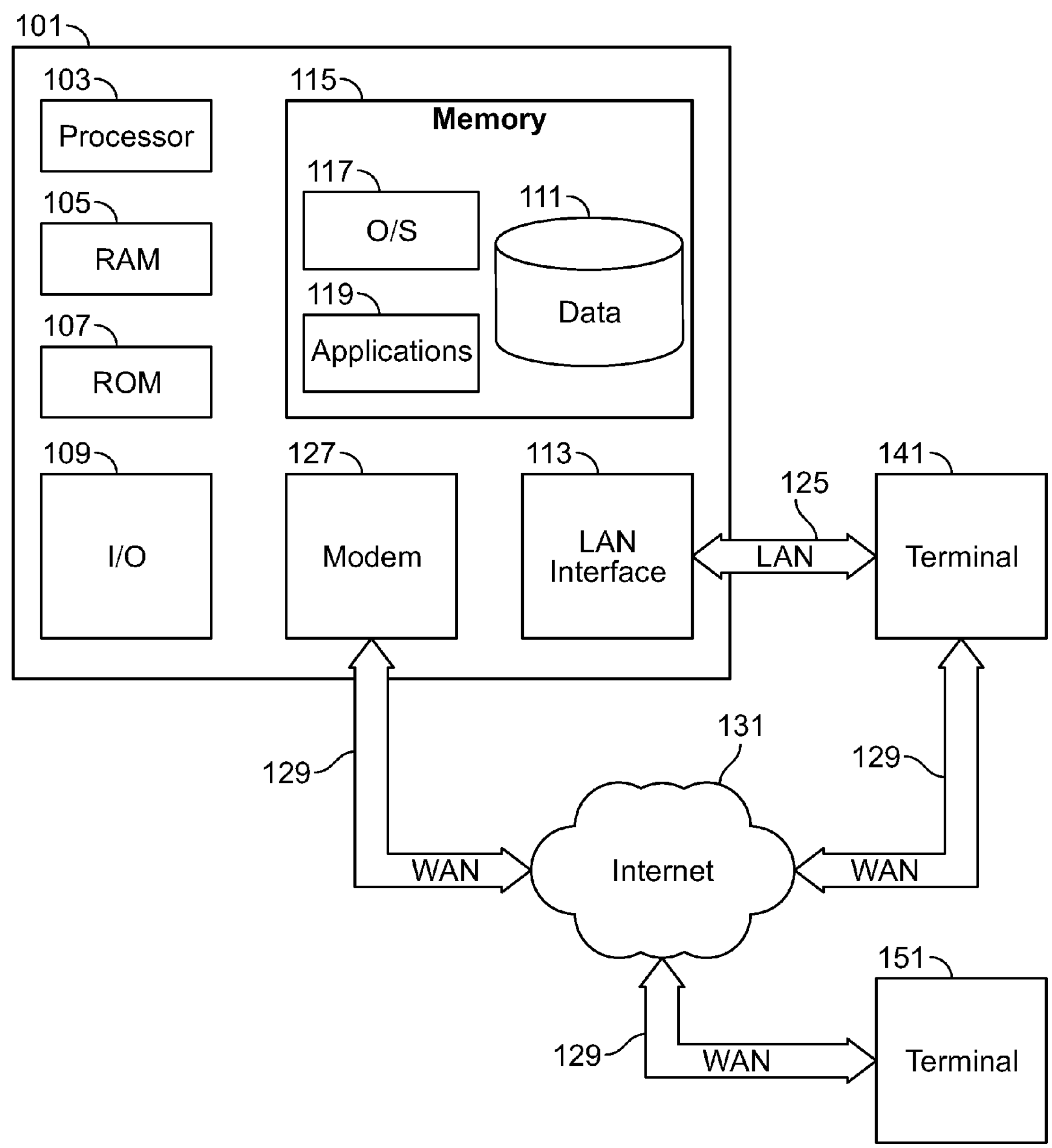
FIG. 1 shows an illustrative apparatus in accordance with principles of the invention.

Apparatus and methods for real time mutable credit card information are provided. Such apparatus and methods may include smartcards and computer hardware and software that are compatible with the internet—i.e., the worldwide web.

The smartcard apparatus may include a microprocessor chip. The apparatus may also include a button, a dynamic transaction authorization number, and a BLE. The BLE may be configured to transmit an instruction to a smartphone.

In some embodiments, the instruction may include a request for a dynamic transaction authorization number.

A request for a new dynamic transaction authorization number may be generated by the smartcard in response to the button being depressed. In certain embodiments, a user may depress the button on the card whenever he or she wishes. Some users may depress the button and request a new dynamic transaction authorization number after every transaction that he or she executes. Other users may depress the button and request a new dynamic transaction authorization number one time per month. Other user may never choose to depress the button and request a new dynamic transaction authorization number.

The BLE may also be configured to receive the dynamic transaction authorization number from a smartphone. The smartcard apparatus may also include a battery. The battery inside the smartcard may be a long-life battery which may have the ability to last for 6 years or more. During the periods of inactivity, the smartcard apparatus may also have the ability to enter sleep mode. This sleep mode capability may prolong the life of the smartcard's internal battery. The battery may be configured to power the BLE. The battery may also be configured to power the microprocessor chip. The smartcard apparatus may also include memory. The memory may be configured to store the dynamic transaction authorization number. The memory may also be configured to store other information: for example, the name of the user, the address of the user, the telephone number of the user and the current time.

The smartcard apparatus may also include a dynamic magnetic strip. The dynamic magnetic strip may include a digital representation of the dynamic transaction authorization number. The dynamic magnetic strip may have the ability to change the digital representation based on the dynamic transaction authorization number.

The smartcard apparatus may also be configured to communicate with an application on a smartphone. The smartcard may be configured to receive information from an administrative device via the application on the smartphone. The smartcard may be also be configured to transmit information to the administrative database network via the application on the smartphone.

The communication of the smartcard with the administrative database network via the smartphone application may allow the user to use the smartcard immediately after depressing the button. Only a short time—e.g., substantially less than a second—after depressing the button, the smartcard's dynamic magnetic strip may already contain the digital representation of the new dynamic transaction authorization number.

In addition, the administrative database network has preferably saved the information relating to the previous dynamic transaction authorization number and the window of time in which the specific dynamic transaction authorization number was valid. The administrative database network has the information for the window of time in which the dynamic transaction authorization number was valid, because the administrative database network saves the timestamp of each button depression.

When a request for a new dynamic transaction authorization number is received, the administrative database network retrieves the dynamic transaction authorization number which has been active until the request, the current timestamp, and the timestamp of the previous button depression. The administrative database network then saves the window of time (the previous timestamp to the current timestamp) and the dynamic transaction authorization number.

The window of time is then used when administrative database network authorizes a transaction. At the point of sale, the merchant may transmit the current dynamic transaction authorization number and the timestamp of the card swipe. The administrative database network may receive the dynamic transaction authorization number and the timestamp of the card swipe. The administrative database network may verify that the transmitted timestamp is included in the window of time in which the specific dynamic transaction authorization number is valid.

The smartcard apparatus may be configured to receive a transmission of the dynamic transaction authorization number from the smartphone.

In response to the depression of the button, the smartcard may also be configured to record the transmitted digital representation and a timestamp of the button depression. In this embodiment, the smartcard may transmit the timestamp of the button depression to the administrative database network together with the request for a new dynamic transaction authorization number. This may alleviate the need for the administrative database network to calculate the current timestamp of the request. This is because the timestamp was received together with the request.

The smartcard may also be configured to receive a new dynamic transaction authorization number from the administrative network via the application on the smartphone.

The smartcard may also be configured change the digital representation on the dynamic magnetic strip on the smartcard in response to receiving a new dynamic transaction number from the smartphone.

The smartcard may also be configured to receive a new dynamic transaction authorization number from the administrative network via the application on the smartphone in response to the administrative network receiving information pertaining to a security threat which may affect the security of the smartcard. The security threat information may be independent of a button depression the user.

The administrative database network may receive information pertaining to a security threat. The administrative database network may then perform a series of algorithms, which may determine which users may be affected by the security threat. For example, if a specific retail store by the fictitious name, SUPER'S SUPERMARKET, discovers skimming devices on its card readers, it may, in turn, notify the administrative database network regarding a security threat at SUPER'S SUPERMARKET.

The administrative database network may then perform a series of algorithms, which determine any credit or debit card holder who used his or her credit or debit card at SUPER'S SUPERMARKET within 60 days of the skimming attack. The administrative database network may then transmit new dynamic transaction authorization numbers to the smartcards, via the smartphone applications, of those users which the administrative database network's algorithms determine to be possibly subject to a security threat.

The microprocessor chip located in the smartcard may also be configured to change the digital representation on the dynamic magnetic strip in response to receiving a new digital representation from the smartphone.

The microprocessor chip located in the smartcard may also be configured to save the digital representation in memory. The microprocessor chip may also be configured to write the dynamic transaction authorization number to the dynamic magnetic strip as a new digital representation.

In some embodiments, the smartcard may receive a future timestamp in addition to a new dynamic transaction authorization number. This combination of a future timestamp and a new dynamic transaction authorization number may be understood by the smartcard as an instruction to save the new dynamic transaction authorization number to memory, but not to write the digital representation to the dynamic magnetic strip, until the point in time of the future timestamp.

In other embodiments, the microprocessor chip may also be configured to save the digital representation directly to the magnetic strip.

In yet other embodiments, the dynamic magnetic strip may be configured to be the memory of the smartcard.

In yet other embodiments, the instruction transmitted from the smartcard to the smartphone may include a request for a dynamic transaction authorization number and a new PIN number. A PIN number is sometimes used in association with a credit or debit card.

In these embodiments, a user is required to swipe his or her credit or debit card at a point of sale or ATM machine, and then the user is required to enter a four digit PIN number. The PIN number is conventionally not written nor saved on the card itself; rather the user must remember his or her PIN number. The use of a PIN number decreases the ability for a thief to obtain usage of stolen credit or debit card information, because the thief may obtain all of the information which is available on the card itself, but may not be able to obtain the PIN number which only the user knows.

A user may wish to change his or her PIN number if he or she feels that the security of the PIN number has been compromised. A user may wish to change his or her pin when, for example, a user sees an unscrupulous person viewing the PIN pad during a transaction that the user executed at an ATM machine. In this embodiment, the user may have the ability to view the new PIN number on an application on his or her smartphone.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

FIG. 1 is an illustrative block diagram of mobile device system 100 based on a computer 101. The computer 101 may have a processor 103 for controlling the operation of the mobile device and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Alternatively, some or all of computer executable instructions may be embodied in hardware or firmware (not shown). The computer 101 executes the instructions embodied by the software to perform various functions.

Input/output ("I/O") module may include connectivity to a microphone, keyboard, touch screen, and/or stylus through which a user of computer 101 may provide input, and may also include one or more speakers for providing audio output and a video display device for providing textual, audiovisual and/or graphical output.

System 100 may be connected to other mobile device systems via a LAN interface 113.

System 100 may operate in a networked environment supporting connections to one or more remote computers, such as terminals 141 and 151. Terminals 141 and 151 may be personal computers or servers that include many or all of the elements described above relative to mobile device system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be mobile devices including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information. Terminals 151 and/or terminal 141 may be other mobile devices. These mobile devices may be identical to mobile device system 100 or different. The differences may be related to hardware components and/or software components.

Figure 2:
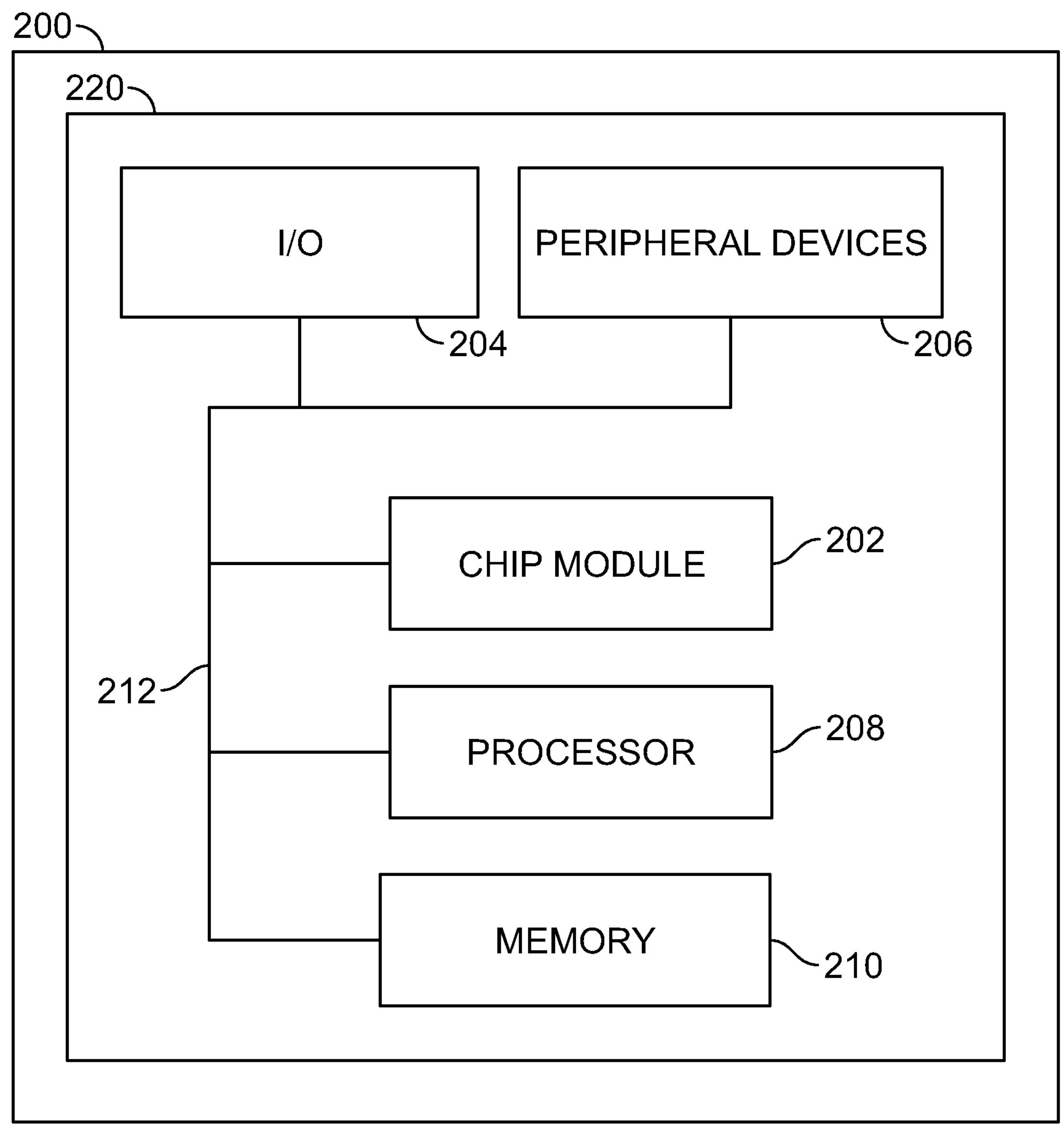
FIG. 2 shows another illustrative apparatus in accordance with the principles of the invention.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data, quantify indices; and machine-readable memory 210.

Machine-readable memory 210 may be configured to store in machine-readable data structures: dynamic transaction authorization numbers, the current time, information pertaining to a credit or debit card user and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network.

In a distributed computing environment, program modules may be located in both local and remote computer storage media including memory storage devices. In a distributed computing environment, devices that perform the same or similar function may be viewed as being part of a "module" even if the devices are separate (whether local or remote) from each other.

Figure 3:
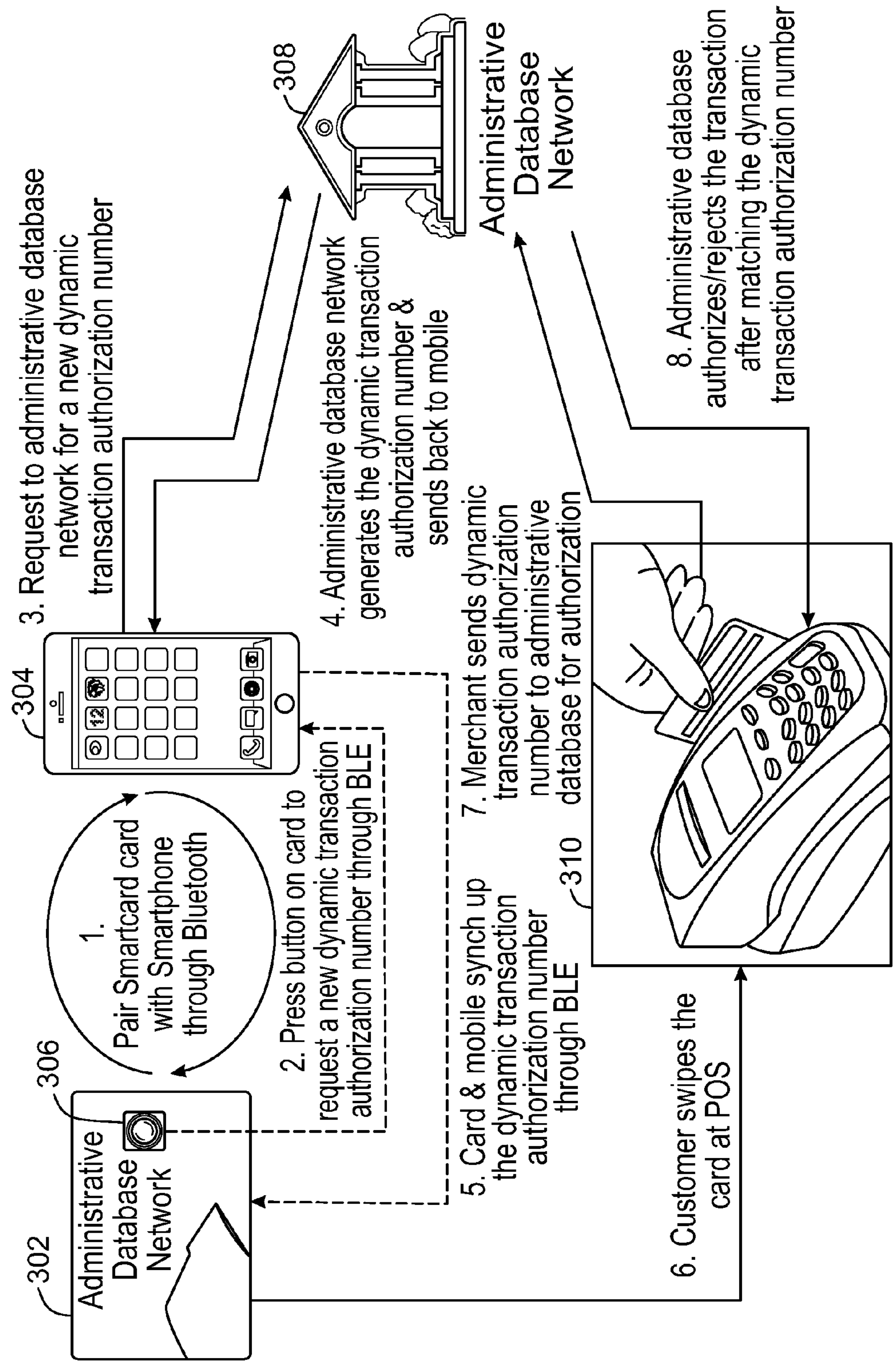
FIG. 3 shows yet another illustrative apparatus in accordance with the principles of the invention.

FIG. 3 shows an illustrative diagram in accordance with the principles of the invention. Step 1 shows smartcard 302 being paired with smartphone 304 through a BLE contained within smartcard 302.

Step 2 shows the pressing of button 306 on card 302 which sends a request through the BLE to smartphone 304 for a new dynamic transaction authorization number.

Step 3 shows smartphone 304 sending a request to administrative database network 308 for a new dynamic transaction authorization number. Step 4 shows administrative database network 308 generating a new dynamic transaction authorization number, and transmitting the new dynamic transaction authorization number to smartphone 304.

Step 5 shows smartphone 304 and smartcard 302 in communication via the BLE. The smartphone then transmits the new dynamic transaction authorization number to the smartcard.

Step 6 shows a customer (who is in possession of smartcard 302) swiping his card at point of sale ("POS") 310.

Step 7 shows the merchant, who received the dynamic transaction authorization number at the POS, sending the dynamic transaction authorization number to administrative database network 308 for authorization.

Step 8 shows administrative database network 308 either authorizing or rejecting the transaction after matching the dynamic transaction authorization number to the correct account.

Figure 4:
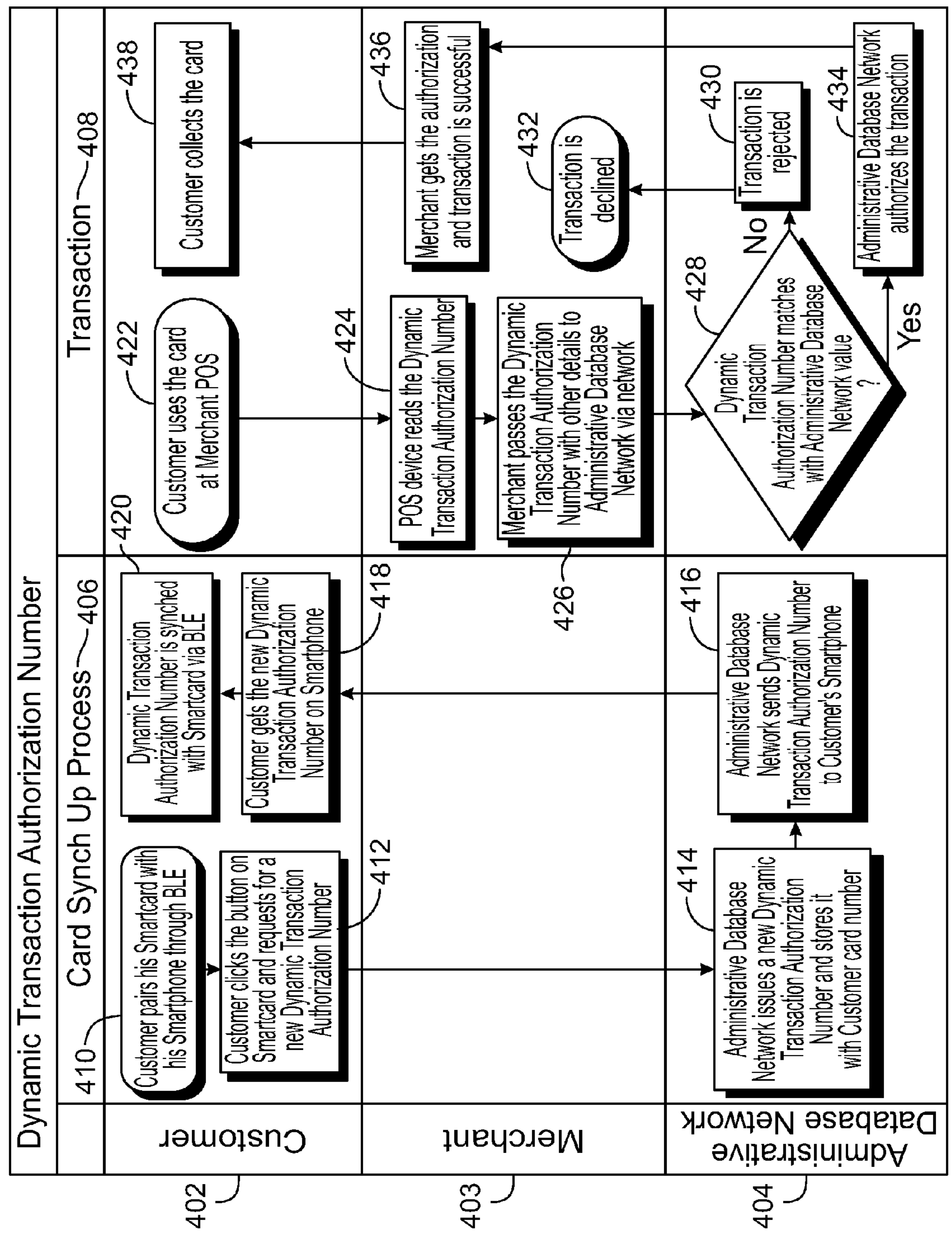
FIG. 4 shows an illustrative flow chart in accordance with the principles of the invention.

FIG. 4 shows another illustrative flow chart in accordance with the principles of the invention. Row 402 relates to the customer aspect. Row 403 relates to the merchant aspect. Row 404 relates to the administrative database network aspect. Column 406 relates to the card synchronization process.

Column 408 relates to the transaction process.

Step 410 shows the customer pairing his smartcard with his smartphone through the BLE. Step 412 shows the customer clicking the button on his smartcard and transmitting a request for a new dynamic transaction authorization number. Step 414 shows the administrative database network issuing a new dynamic transaction authorization number and the administrative database network storing the dynamic transaction authorization number together with the customer card number.

Step 416 shows the bank sending the new dynamic transaction authorization number to the customer's smartphone. Step 418 shows the customer receiving the new dynamic transaction authorization number on his smartphone. Step 420 shows the dynamic transaction authorization number is synched with the smartcard via the BLE.

Step 422 initiates the transaction process. Step 422 shows the customer using his smartcard at a merchant POS. Step 424 shows a POS device reading the dynamic transaction authorization number.

Step 426 shows the merchant passing the dynamic transaction authorization number, preferably together with other details, to the administrative database network via a network. Step 428 shows the administrative database network querying whether the dynamic transaction authorization number matches the bank value. Step 430 shows if dynamic transaction authorization number does not match the bank value, the transaction fails.

Step 432 shows that the failed transaction is declined at the merchant.

Step 434 shows if the dynamic transaction authorization number matches the bank value, the administrative database network authorizes the transaction. Step 436 shows the merchant receives the authorization and the transaction is successful. Step 438 shows the customer receiving the card from the merchant.

Thus, methods and apparatus for providing real time mutable credit card information is provided. Persons skilled in the art will appreciate that the present invention can be practiced by other than the described embodiments, which are presented for purposes of illustration rather than of limitation, and that the present invention is limited only by the claims that follow.

What is claimed is:

1. A smartcard apparatus comprised of
a microprocessor chip;
a button;
a dynamic transaction authorization number; and
a Bluetooth low energy device ("BLE") which is configured to:
transmit an instruction to a smartphone for a request for a dynamic transaction authorization number, when the button is depressed;
receive the dynamic transaction authorization number from a smartphone;
a battery configured to power the BLE and the microprocessor chip;
memory configured to store the dynamic transaction authorization number; and
a dynamic magnetic strip comprising a digital representation of the dynamic transaction authorization number;
wherein the smartcard is configured to:
communicate with an application on a smartphone;
receive information from an administrative database network via the application on the smartphone;
transmit information to the administrative database network via the application on the smartphone;
receive a transmission of the digital representation of the dynamic transaction authorization number from the application on the smartphone;
record the transmitted digital representation and a timestamp of the button depression in response to the depression of the button on the smartcard;
receive a new dynamic transaction authorization number and a future timestamp from the administrative network via the application on the smartphone;
save the new dynamic transaction authorization number and the future timestamp to the memory; and trigger, at the time of the future timestamp, writing, from the memory to the dynamic magnetic strip, a digital representation of the dynamic transaction authorization number.

2. The apparatus of claim 1 wherein the smartcard is configured to change the digital representation on the smartcard in response to receiving a new digital representation from the smartphone.

3. The apparatus of claim 2 wherein the smartcard is configured to receive a new digital representation from the administrative network via the application on the smartphone in response to the administrative network receiving information pertaining to a security threat which may affect the security of the smartcard.

4. The apparatus of claim 3 wherein the microprocessor chip located in the smartcard is configured to change the digital representation on the dynamic magnetic strip in response to receiving a new digital representation from the smartphone.

5. The apparatus of claim 4 wherein the microprocessor chip located in the smartcard is configured to:

save the digital representation in memory; and write the digital representation to the dynamic magnetic strip.

6. The apparatus of claim 5 wherein the microprocessor chip is further configured to save the digital representation directly to the magnetic strip.

7. The apparatus of claim 6 wherein the memory is the dynamic magnetic strip.

8. A method for using a smartcard, the smartcard comprising a microprocessor chip, a button, a dynamic transaction authorization number, a Bluetooth low energy ("BLE") device, a battery configured to power the BLE and the microprocessor chip, memory configured to store the dynamic transaction authorization number, a dynamic magnetic strip comprising a digital representation of the dynamic transaction authorization number, the method comprising:

transmitting, upon depression of the button, an instruction to a smartphone for a request for a dynamic transaction authorization number;

receiving a dynamic transaction authorization number from the smartphone;

receiving a future timestamp and a new dynamic transaction authorization number from an administrative database network via an application on the smartphone;

saving the new dynamic transaction authorization number to memory; and trigger, at the time of the future timestamp, writing from the memory to the dynamic magnetic strip, a digital representation of the dynamic transaction authorization.

9. The method of claim 8, wherein the method further comprises transmitting information to the administrative network via the application on the smartphone.

10. The method of claim 9, wherein the method further comprises receiving a transmission of the digital representation of the dynamic transaction authorization number from the smartphone.

11. The method of claim 10, wherein the method further comprises, in response to the button depression recording:

the transmitted digital representation; and a timestamp of the button depression.

12. The method of claim 11, wherein the method further comprises receiving a new digital representation from the administrative network via the application on the smartphone.

13. The method of claim 12, wherein the method further comprises changing the digital representation of the smartcard in response to receiving a new digital representation from the smartphone.

14. The method of claim 13, wherein the method further comprises receiving a new digital representation form the administrative network via the application on the smartphone in response to the administrative network receiving information pertaining to a security threat which may affect the security of the smartcard.

15. The method of claim 14, wherein the method further comprises saving the digital representation directly to the smart card's magnetic strip.

16. The method of claim 15, wherein the method further comprises:

saving the digital representation in memory; and writing the digital representation to the dynamic magnetic strip.

17. A system for changing smartcard information on one or more smartcards comprising a microprocessor chip, a button, a dynamic transaction authorization number, a Bluetooth low energy ("BLE") device, a battery configured to power the BLE and the microprocessor chip, memory configured to store the dynamic transaction authorization number, a dynamic magnetic strip comprising a digital representation of the dynamic transaction authorization number, the system comprising:

an administrative database network in communication with a plurality of smartcards, via applications on a plurality of smartphones;

the administrative database network configured to transmit a plurality of discrete dynamic transaction authorization numbers and a plurality of future timestamps to one or more of the smartcards, the transmission being instructive to the smartcard to:

save the dynamic transaction authorization number and the future timestamp to the memory; and trigger, at the time of the future timestamp, writing from the memory to the dynamic magnetic strip, the digital representation based on the transmitted discrete dynamic transaction authorization number.

18. The system of claim 17, wherein the administrative network is configured to transmit a new discrete dynamic transaction authorization number to one or more smartcards via an application on one or more smartphones, in response to receiving information regarding a security threat which may affect one or more smartcards.

* * * * *